United States Patent [19]

Andress

[11] 4,380,107
[45] Apr. 19, 1983

[54] CONNECTOR PIN HANDLING DEVICE

[75] Inventor: Dennis I. Andress, Two Rivers, Wis.

[73] Assignee: The Manitowoc Company, Inc., Mantiwoc, Wis.

[21] Appl. No.: 877,903

[22] Filed: Feb. 15, 1978

[51] Int. Cl.³ .............................................. B23P 19/04
[52] U.S. Cl. ....................................................... 29/252
[58] Field of Search ............................................ 29/252

[56] References Cited

U.S. PATENT DOCUMENTS

| | | | |
|---|---|---|---|
| 2,387,551 | 10/1945 | Abramson et al. | 29/252 X |
| 3,333,320 | 8/1967 | Black | 29/252 |
| 3,390,446 | 7/1968 | Ettorre | 29/252 |
| 3,711,925 | 1/1973 | Mazer | 29/252 |
| 3,871,053 | 3/1975 | Thornsbury | 29/252 |

Primary Examiner—James G. Smith

Attorney, Agent, or Firm—Leydig, Voit, Osann, Mayer & Holt, Ltd.

[57] ABSTRACT

A device for handling connector pins, that is, for inseting and removing pins from alined holes in structural members, comprising a pair of frame plates notched to fit over the structural members and which are formed to receive the hydraulic jack and pump of a conventional tool so that extension of the jack moves the connector pin into or out of position. For insertion, the frame receives a pin in alinement with holes in the structural member, and for removal the frame includes a tray for receiving the pin when it is pushed free. In each case, extension of the jack causes pin movement. The center of gravity of the device, and a suspension member, is to the jack side of the notches so that the device can be manipulated at one side of the lower cord of a crane boom, for example. Jack piston extensions and pin handling tools are provided.

3 Claims, 4 Drawing Figures

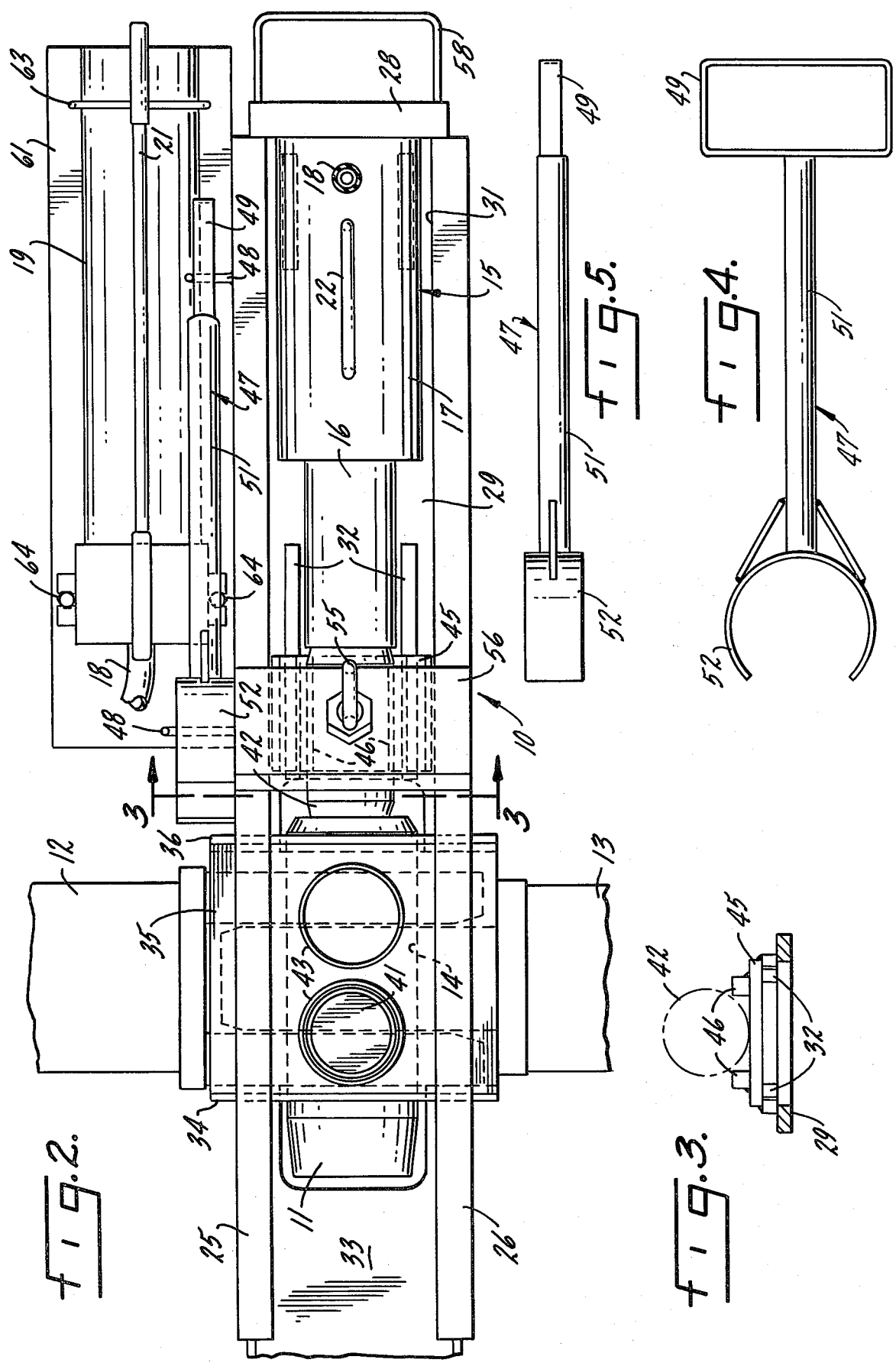

CONNECTOR PIN HANDLING DEVICE

This invention relates generally to the setting and removal of structural pins and more particularly concerns a hydraulically powered device for that purpose.

Large lift cranes, for one example, are conventionally assembled on the job site from a broken down or shipping configuration. The boom and possibly a mast are put together from standard sections, with the number of sections being selected to produce the desired length. Such mast sections are normally pinned together by structural pins, i.e., solid steel cylinders which, for larger cranes, may be over four inches in diameter. The pins are fitted into alined holes usually formed in the ends of the longitudinal structural members of the mast sections. When the crane is disassembled, the pins are removed.

The conventional way of inserting and removing such pins is with a two-man team, one to position the heavy pin and the other to drive it with a sledge. This is obviously difficult and even dangerous work. Moreover, in recent years with crane booms becoming bigger and longer, designers have tried to reduce boom side sway by tightening the pin connections, that is, reducing the tolerances between the hole and the pin diameter so that the pins fit more tightly. This increases the difficulty of placing and removing the pins.

Accordingly, it is the primary aim of the invention to provide an economical power device for quickly and safely placing and removing structural pins, even those requiring great force to position. A collateral object of the invention is to provide a device as described which permits working in regions that may be obstructed above, such as the lower structural members of crane boom sections which underlie the rest of the boom structure.

Another object is to provide a device of the above type which can be easily manipulated by one man. A related object is to provide a device as characterized above that retains control of the pin, so that it is not dropped, whether the pin is being inserted or removed.

Other objects and advantages of the invention will become apparent upon reading the following detailed description and upon reference to the drawings, in which:

FIG. 2 is a top plan of the device shown in FIG. 1;

Figure 1:
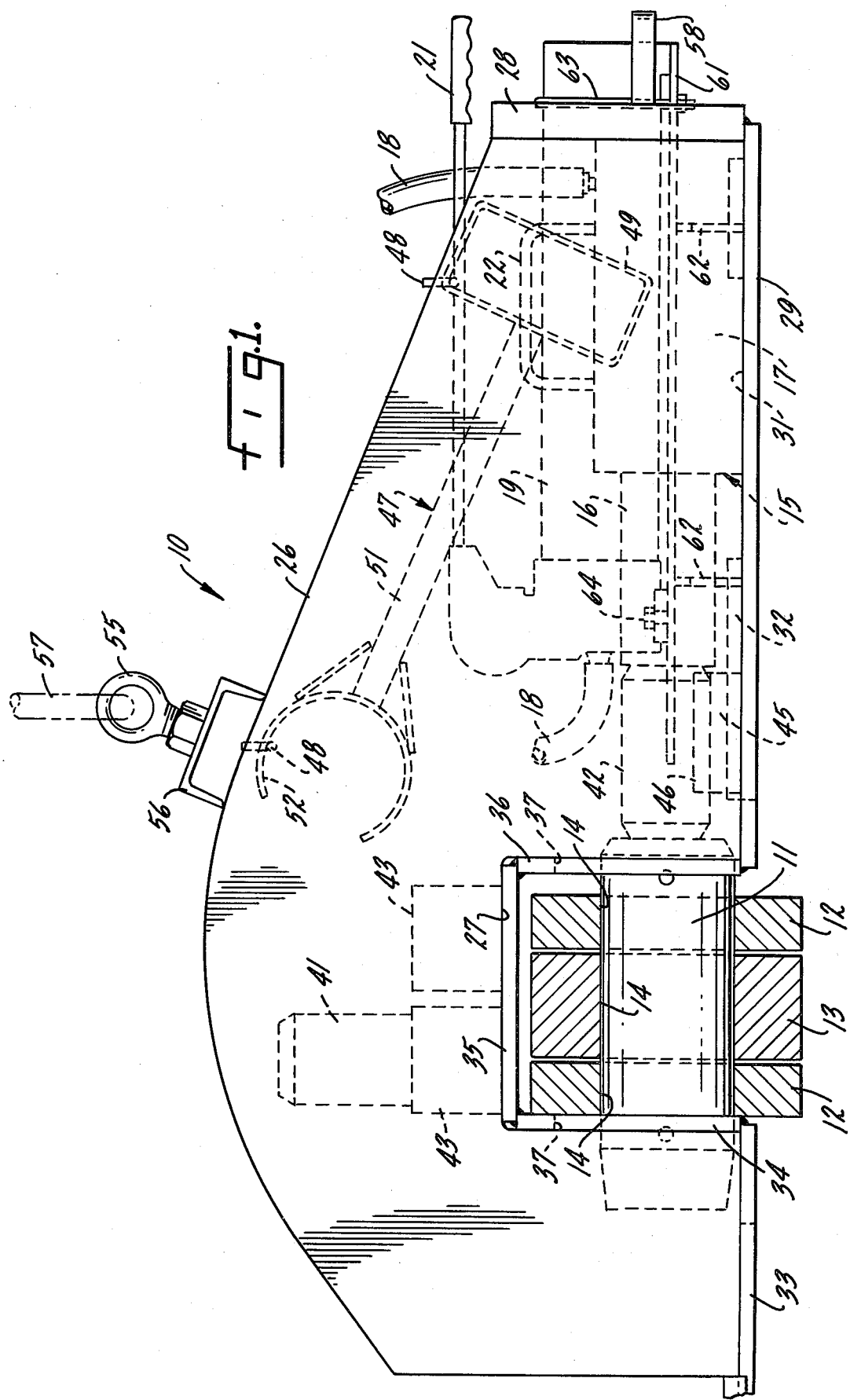
FIG. 1 is a side elevation of a device embodying the invention.

FIG. 3 is a fragmentary section taken approximately along the line 3—3 in FIG. 2; and FIGS. 4 and 5 are side elevations of a tool used in connection with the device shown in FIGS. 1 and 2.

While the invention will be described in connection with a preferred embodiment, it will be understood that I do not intend to limit the invention to that embodiment. On the contrary, I intend to cover all alternatives, modifications and equivalents as may be included within the spirit and scope of the invention as defined by the appended claims.

Turning now to the drawings, there is shown a device 10 embodying the invention and illustrated, for purposes of explanation, in position to remove a pin 11 from a pair of interfitted structural members 12 and 13 having alined holes 14. The device 10 is powered by a jack 15 having a piston 16 in a cylinder 17 that is coupled via a line 18 to a pump 19 with a pumping handle 21 and, in keeping with the invention, the jack 15 is a standard 50-ton capacity tool as conventionally supplied with a heavy lift crane for assemblying crawler tracks and the like. For portability, a handle 22 is mounted on the jack cylinder 17.

In accordance with the invention, the device 10 includes a pair of heavy frame plates 25 and 26, having alined notches 27 to fit over the structural members 12, 13, connected by a butt plate 28 and a bed plate 29 which define a trough 31 in which the jack 15 is rested. The trough 31 is sufficiently long to receive the pin 11 on slides 32 between the notches 27 and the jack 15 when the piston 16 is in the cylinder 17 so that hydraulically extending the piston 16 will force the pin 11 transversely of the notches 27 and into the holes 14. The frame plates 25, 26 also have a pin receiving tray plate 33 on the side of the notches 27 opposite the jack 15 for receiving the pin 11 when the jack is used to force the pin from the members 12, 13.

Preferably, the frame plate notches are lined with plates 34, 35 and 36, with the plates 34 and 36 being apertured at 37 to receive the pin 11, which plates are secured to the frame plates 25, 26 to give the device 10 structural stability. The plate 34 also gives added bearing area against the structural member 12 when the jack 15 is working, since the force exerted by the jack is applied against the lining plate 34 and the butt plate 28, which plates directly load the heavy frame plates 25 and 26 in tension, which they are well able to resist. When a connector pin such as the pin 11 is being removed, or is almost in the final seated position, it will usually be desired to extend the reach of the jack piston 16 and, for that purpose, a pair of smaller diameter push pins 41 and 42 are stored in sockets 43 on the plate 35 so that they can be fitted in as illustrated by the position of the pin 42 in the drawings.

To maintain alinement of one of the push pins 41 or 42, the connector pin 11 and the jack piston 16, a lift plate 45 is fitted on the slides 32 to provide slightly higher slides 46 for the smaller diameter push pins 41, 42. For conveniently handling the connector pin 11, both in placing it on the slides 32 for initial assertion and for removing it from the tray plate 33, a tool 47 is stored on hooks 48 at the side of the frame plate 25, with the tool 47 having a handle 49 at one end of a shaft 51 and a pin embracing portion 52 at the other end. The tool 47 is used by moving the portion 52 to one end of a pin 11 and sliding it longitudinally until the pin is balanced and can be lifted by the handle 49.

As a feature of the invention, the device 10 is proportioned to be balanced off to the jack side of the notches 27, and an element 55 is mounted on a beam 56 centrally of the frame plates 25, 26 for attaching a suspension line 57 substantially at the balance point of the device. In this way, a small auxiliary crane carrying the line 57 can position the device 10 at the side of a large crane boom, for example, and the notched portion of the plates 25, 26 can be moved into the boom structure and down over the members 12, 13 without interference from any overlying boom structure, the suspension pointed defined by the element 55 being off to one side. A frame handle 58 is fixed to the outer end of the butt plate 28 so that as the user of the device 10 pumps the handle 21 to move the heavy pin 11 longitudinally of the device, the change in balance of the unit can be compensated by the operator applying force to the handle 58. For initial positioning of the device 10 for pin insertion, it will be noted that the pin 11 will rest on the slides 32 substantially beneath the suspension point so that the device remains in balance.

The jack 15 is simply rested in the trough 31 since it is not subject to other than linear forces, but the pump 19 is mounted on a platform 61 held by brackets 62 so as to be fixed on the frame plate 25, and the pump is inserted within a tiedown strap 63 at one end and has its opposite end secured to the platform 61 by a pair of bolts 64. Thus, only a pair of bolts need be manipulated to install or remove the jack 15 from the remaining portions of the device.

It will now be appreciated that the device 10 is capable of utilizing the full force of the hydraulic jack 15 because of its box-like girder construction. Nevertheless, it will be appreciated that it can be manipulated essentially by one man who, with the aid of device 10, can set and remove connector pins quickly, safely and efficiently. Those skilled in the art will also appreciated that the relatively straightforward design of the device 10 permits it to be economically manufactured, particularly since it contemplates the use of a standard conventional hydraulic jack which can be easily removed to perform its other intended functions.

I claim as my invention:

1. A device for handling connector pins comprising, in combination, a pair of frame plates having alined notches to fit over structural members with holes to receive connector pins, said plates being connected with a butt plate and a bed plate defining a jack receiving trough, a hydraulic jack with a piston in a cylinder rested in said trough, said plates and trough being sufficiently long to receive a pin between said notches and said jack when said piston is in said cylinder and the jack is adjacent said butt plate so that hydraulically extending the piston will force the pin transversely of the notches and into holes in members in said notches, said frame plates having a pin receiving tray on the side of said notches opposite said jack for receiving the pin when the jack is used to force a pin from members in said notches, and a pin carrying tool having a handle and a pin embracing portion, and a pair of auxiliary push pins for extending the reach of said jack by being inserted between said jack and a connector pin, and said side frames having sockets for storing said push pins and hooks for storing said tool.

2. The combination of claim 1 in which said device is proportioned to balance at a point off to the jack side of said notches, and said frame plates have an element for attaching a suspension line substantially at said balance point.

3. The combination of claim 1 including a platform adjacent one of said frame plates, and a hydraulic pump releasably secured to said platform and connected to said jack for powering the latter, said jack and pump being a standard tool selectively mounted in and on said device.

* * * * *